United States Patent
Buyukkoc et al.

(10) Patent No.: US 9,420,602 B2
(45) Date of Patent: Aug. 16, 2016

(54) EMERGENCY AND PRIORITIZED ACCESS TO WIRELESS RESOURCES

(75) Inventors: Cagatay Buyukkoc, Holmdel, NJ (US); Sreevalsan Vallath, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 993 days.

(21) Appl. No.: 12/643,265

(22) Filed: Dec. 21, 2009

(65) Prior Publication Data

US 2011/0151885 A1    Jun. 23, 2011

(51) Int. Cl.
| | |
|---|---|
| *H04M 11/04* | (2006.01) |
| *H04W 36/00* | (2009.01) |
| *H04W 72/00* | (2009.01) |
| *H04W 72/12* | (2009.01) |
| *H04W 36/22* | (2009.01) |

(52) U.S. Cl.
CPC .......... *H04W 72/1247* (2013.01); *H04W 36/22* (2013.01); *H04W 72/1252* (2013.01)

(58) Field of Classification Search
CPC . H04L 41/50; H04L 41/5003; H04L 41/5019; H04L 41/5022; H04L 41/5025
USPC ................ 455/404.1, 436, 439, 452.1, 452.2
See application file for complete search history.

(56) References Cited

U.S. PATENT DOCUMENTS

| | | | | |
|---|---|---|---|---|
| 6,067,457 | A * | 5/2000 | Erickson et al. | 455/512 |
| 6,980,523 | B1 * | 12/2005 | Lipford et al. | 370/252 |
| 2002/0107021 | A1 * | 8/2002 | Ishikawa et al. | 455/436 |
| 2008/0090547 | A1 * | 4/2008 | Struhsaker | 455/404.1 |
| 2009/0080451 | A1 * | 3/2009 | Gogic | 370/412 |

* cited by examiner

*Primary Examiner* — Rafael Perez-Gutierrez
*Assistant Examiner* — Joshua Schwartz
(74) *Attorney, Agent, or Firm* — Baker & Hostetler LLP

(57) ABSTRACT

A radio resources management algorithm, through a process of function evaluation and optimization, determines and assigns resource priority values to wireless resource requests. Resource requests may be arranged within a priority queue in accordance with the priority values. The priority queue may control access to wireless resources that are typically reserved for handing off ongoing calls between cells. The algorithm may supplement or replace an existing CAC algorithm. The algorithm may also determine whether sufficient spare handoff resources are available to fulfill a resource request. If sufficient resources are not available, the disclosed algorithm may implement one or more congestion control mechanism designed to free up handoff resources. If sufficient resources are not available to fulfill a resource request, the resource request may be accepted and arranged in the priority queue if it is of sufficiently high priority, or may be rejected if the request is of low priority.

18 Claims, 6 Drawing Sheets

EMERGENCY AND PRIORITIZED ACCESS TO WIRELESS RESOURCES

BACKGROUND

During periods when a cell within a wireless network suffers excessive congestion, cellular capacity (i.e., wireless resources) within that cell typically become scarce. Excessive congestion within a cell may result from the simultaneous consumption of a large percentage of the available wireless resources within the cell. Various events within a cell are capable of causing such consumption; such as an emergency situation which results in an abnormally high call volume within the cell, an abnormally high number of devices simultaneously located within the cell, etc.

Scarcity of wireless resources often causes degradation of service within a cell. For example, during periods of excessive congestion, wireless resources may not be adequate to fulfill requests from devices within the cell for new wireless connections and/or to accept handoffs when devices with ongoing wireless connections approach or enter the cell. Wireless connections may include cellular calls between mobile communications devices, data transfers between mobile devices, and the like. The inability to facilitate new connections may become problematic, for example in crisis situations where emergency responders may require new connections in order to exchange vital information. Contributing to the problem is the fact that preemption of ongoing cellular calls is often prohibited, precluding the disconnection of those calls to allow connections for the emergency responders to be fulfilled. Congestion within a cell may also cause service quality to degrade below guaranteed levels for premium subscribers.

A typical solution employed during periods of excess cell congestion is to provide high priority users, such as emergency responders, priority access to wireless resources as they become available. However, a major shortcoming to this approach is that resources may become available slowly during such periods of congestion, causing holding periods for resource availability to become excessive. Thus, emergency responders may still be prevented from gaining timely access to wireless resources.

SUMMARY

A radio resources management algorithm, through a process of function evaluation and/or optimization, determines and assigns resource priority values to wireless resource requests. The requests may be arranged within a priority queue in accordance with the priority values. A new priority queue may be created by the algorithm, or the newly created optimized priority values may replace those assigned in an existing resource queue, for example a resource queue controlled by an existing connection admission control (CAC) algorithm. The priority queue may control access to wireless resources that are typically reserved for handing off ongoing calls between neighboring cells. The disclosed algorithm may supplement or replace an existing CAC algorithm, such as a "first come first serve" algorithm for handoff resource allocation.

The disclosed algorithm may also determine whether sufficient spare handoff resources are available to fulfill a resource request. If sufficient resources are not available, the disclosed algorithm may implement one or more congestion control mechanisms designed to free up handoff resources. If sufficient resources are not available to fulfill a resource request, the resource request may be accepted and queued if it is of sufficiently high priority, or may be rejected if it is of low priority.

The disclosed algorithm may be initiated in response to a congestion condition within a network. Alternatively, the algorithm may operate continuously as a supplement to or replacement for an existing connection admission control algorithm. Continuous operation may be advantageous, for example in a scenario where full time prioritization is desirable. The algorithm may be deployed to prioritize resource requests on an individual network element, for example a base transceiver station. The algorithm may also be deployed to function in concert with a centralized control, such as a network resource admission control, to provide coordinated prioritization of resource access to particular portions of a network, or network wide.

DETAILED DESCRIPTION OF ILLUSTRATIVE EMBODIMENTS

A new radio resources management algorithm, through a process of function evaluation and optimization, determines and assigns resource priority values to requests for access wireless resources. The requests may be arranged within a priority queue in accordance with the optimized priority values. For example, during a period of excessive congestion within a cell, there may be little to no wireless resources available to fulfill new connection requests and/or handoff requests. In such a scenario, a wireless resource request by an emergency responder within the cell may be delayed or even rejected. The radio resource management algorithm may assign a high priority to the wireless resource request of the emergency responder so it is processed before all other pending and new requests, and may also act to relieve the congestion within the cell by employing one or more congestion control mechanisms.

The radio resource management algorithm may be configured to prioritize resource requests for a cell provisioned on an individual network element, for example a base transceiver station. The radio resource management algorithm may be implemented in the hardware and/or software of such a network element. In another embodiment, the radio resource management algorithm may be configured to operate cooperatively with an existing connection admission control (CAC) algorithm. In an embodiment, the radio resource management algorithm may be initiated only in response to specific conditions within a cell, for example a congestion condition. Alternatively, the radio resource management algorithm may operate continuously, prioritizing all resource requests received for a cell, for example in a scenario where full time prioritization is desirable. In another embodiment, the radio resource management algorithm may be configured to function in concert with a centralized control, such as a network resource admission control, in order to provide coordinated prioritization of resource access to particular portions of a network, such as a group of cells located within a geographic region, or to provide coordinated prioritization of resource access across an entire wireless and/or wireline network.

Figure 1:
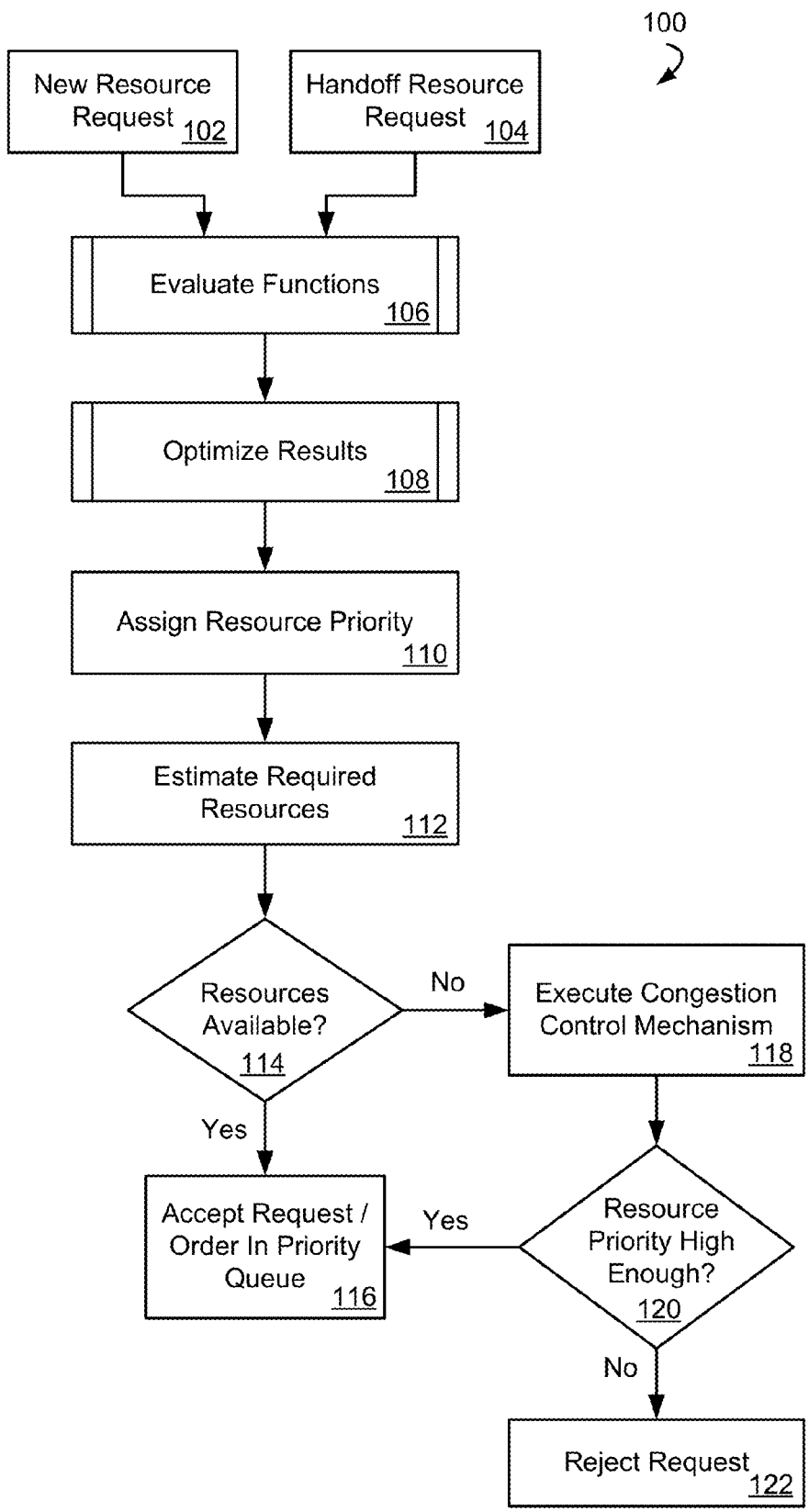
FIG. 1 is a flow diagram of an example process for prioritizing requests to network resources in accordance with a radio resource management algorithm.

FIG. 1 is a flow diagram 100 of an example process for prioritizing requests to wireless network resources within a cell in accordance with a radio resource management algorithm. A wireless resource request typically takes the form of a message transmitted from a requesting device to a network communications device that may be in control of admission to wireless network resources.

The requesting device may be a mobile device configured to communicate via a wireless network, examples of which include a portable phone (e.g., a cell phone or the like, a smart phone, a video phone), a portable computing device (e.g., a laptop), a personal digital assistant (PDA), a portable email device, a portable gaming device, a portable television, a portable DVD player, a portable media player (e.g., a portable music player, such as an MP3 player, a walkmans, etc.), a portable navigation device (e.g., a GPS compatible device, an A-GPS compatible device, etc.), or a combination thereof. The requesting device may also be a device that is not typically thought of as portable, such as, for example, a public computing device, a navigation device installed in-vehicle, a set top box, or the like. The requesting device may also include devices that are not conventional computing devices, such as, for example, a kitchen appliance, a motor vehicle control (e.g., a steering wheel), or the like.

The network device may be any appropriate device configured to provide services in a wireless and/or wireline communications network, examples of which include a base transceiver station (BTS), a base station controller (BSC), a mobile switching center (MSC), a service control point (SCP), an access/service gateway (A/S GW), a service GPRS support node (SGSN), a gateway GPRS support node (GGSN), a home location register (HLR), a visitor location register (VLR), an authentication center (AuC), a cell broadcast center (CBC), a domain name server (DNS), a firewall, and the like.

The resource requested is most often a portion of wireless bandwidth, typically corresponding to one or more wireless radio channels within a frequency band assigned to a particular cell. A wireless channel may be used for a variety of services, for example a cellular voice call, a data transfer connection, a video and/or audio streaming session, or any other form of service that may be provisioned over a wireless network connection.

Requests for wireless resources are typically one of two varieties; a new resource request as received at step 102 or a handoff resource request as received at step 104. A new resource request may indicate that a device within the cell is attempting to establish a new connection using wireless resources of the cell. A handoff resource request may indicate that a device currently connected to a resource of a neighboring cell is requesting that its connection be handed off from the resource of the neighboring cell to a wireless resource in the cell the request is directed towards. The handoff resource request may be of a hard handoff nature or a soft handoff nature. Hard and soft handoffs are well known in the art and will not be described in detail herein.

When a new resource request and/or a handoff resource request are received at steps 102 and/or 104 respectively, the radio resource management algorithm may evaluate functions at step 106. The functions evaluated at step 106 may include a handoff priority function (HOP), a new call priority function (NCP), a global priority function (GPF), and the like, or any combination thereof. The radio resource management algorithm may evaluate one or more of these functions as necessary. A decision of which function(s) to evaluate may be based on current wireless resource usage and/or availability conditions in a cell, neighboring cells, the network as a whole, or any combination thereof. For example, the functions may be configured to perform a more rigorous evaluation during periods of excessive congestion in the cell. The functions may be configurable by the radio resource management algorithm, such that they may be evaluated using a variety of factors, for example: a profile class of a subscriber and/or a device associated with the resource request; quality of service (QoS) parameters that may be associated with the profile class, the type of resource request, etc.; key performance indicators, such as those monitored by a base transceiver station; a quality of service control indicator (QCI); a critical indicators (CI), such as those declared by a homeland security agency and/or operator when wireless resources are extremely congested; a roaming indicators (RI) (in roaming scenarios from different operators special payment options might apply an hence would impact priority); a device indicator (DI), which may indicate a type of device, such as cell phone, laptop, etc; and the like.

How the functions are configured prior to their evaluation may be adaptively altered by the radio resource management algorithm, for example by changing which factors are selected for evaluation, the weighting given to individual factors, and the like. In the process of adaptively altering the functions, the radio resource management algorithm may take into account information pertaining to the wireless resources of the cell, for example statistics and/or other data pertaining to wireless resource use and/or availability in the cell. The information may be historical in nature, or may be collected in real time. The radio resource management algorithm may also take into account similar information received and/or recorded from neighboring cells. Neighboring cell data may be received from a network component in the neighboring cell, for example a base transceiver station, or from another device within the network, such as a network resource admission control. Information from a network device such as a network resource admission control may also include network-wide information pertaining to wireless and/or wireline resources.

Evaluating the functions enables the radio resource management algorithm to determine a resource priority value for the resource request. For example, evaluating a new call priority function for a new resource request received at step 102 may result in a resource priority value for the new call request, while evaluating a handoff priority function for a handoff resource request received at step 104 may result in a resource priority value for the handoff request. In an embodiment, a global priority function may be evaluated as a summation of HOP and NCP functions, and the factors evaluated may contain information collected from a number of network devices, for example a network of interconnected base transceiver stations. It is to be noted that the functions and factors listed herein are merely examples, and the scope of the instant disclosure should not be limited thereto.

At step 108, the resource priority values resulting from the functions evaluated at step 106 may be optimized. The optimization process may be carried out in accordance with one or more constraints, such as a probability of dropping (Pd) and/or a probability of blocking (Pb). For example, it may be advantageous to minimize the probability of dropping when a cell is currently receiving a disproportionately high volume of handoff resource requests. Similarly, it may be advantageous to minimize the probability of blocking when a cell is currently receiving a disproportionately high volume of new resource requests. The probability values may be determined in real time by the radio resource management algorithm in accordance with other factors, may be pre-determined and accessed from storage and memory when the optimization process is performed, or a combination thereof. In another embodiment, the optimization process of step 108 may be omitted. It is to be noted that the optimization constraints listed herein are merely examples, and the scope of the instant disclosure should not be limited thereto.

Once the resource priority values have been optimized or the optimization process has been omitted, the resource priority value is assigned to the resource request. The resource priority value may replace an earlier assigned priority value, for example a resource priority (i.e., QCI) assigned in accordance with 3GPP standards (TS 23.203).

After, or concurrently with, the evaluation, optimization, and assignment of the resource priority value, the radio resource management algorithm may, at step 112, estimate a quantity of wireless resources required to fulfill the resource request. The quantity of wireless resources required to fulfill the resource request may be estimated in accordance with the type of the resource request, the current modulation and coding scheme (MCS) level of the requesting device, and the like. The estimate will typically be calculated in accordance with the particular interface technology of the cell the request is directed to. For example, the quantity of wireless resources required to fulfill a resource request in an LTE wireless cell may be estimated (i.e., calculated) in terms of physical resource blocks (PRBs). A resource request to an LTE wireless cell will typically specify an amount of required cellular network bandwidth (i.e., resources), $B_{req}$. A modulation and coding scheme (MCS) level is typically associated with the requesting device. The estimated quantity of wireless resources required to fulfill the LTE resource request, in other words the number of physical resource blocks required ($NPRB_{req}$) to fulfill the request, may be calculated using $B_{req}$ and the bandwidth of the current MCS level (BPRB(MCS)), where $$NPRB_{req} = \frac{B_{req}}{BPRB(MCS)}.$$

Once the quantity of wireless resources required to fulfill the resource request has been estimated, the estimate may be compared against the total amount of wireless resources available in the cell, at step 114. The total amount of available wireless resources in a cell will typically be calculated in accordance with the particular interface technology of the cell the request is directed to. Returning to the LTE example, the calculation of available physical resource blocks may be based upon resource block usage by existing resource connections (e.g., cellular calls, data connections, streaming sessions, and the like) as measured by the base transceiver station the cell is provisioned on. The number of free physical resource blocks ($NPRB_{free}$) can then be determined using $$NPRB_{free} = NPRB_{tot} - NPRB_{nrt} - NPRB_{rt},$$

where $NPRB_{tot}$ may be the number of total PRBs in the cell, $NPRB_{nrt}$ is the number of PRBs dedicated to non real-time resource connections, and $NPRB_{rt}$ is the number of PRBs dedicated to real-time resource connections. The radio resource management algorithm may determine $NPRB_{tot}$ from resource data provided by the network hardware and/or software on which the cell is provisioned, for example a base transceiver station. In determining $NPRB_{tot}$, the radio resource management algorithm may employ various limitations and/or filters to the resource data. For example, in an embodiment, the radio resource management algorithm may determine the total number of physical resource blocks that are presently reserved for handoff traffic, filtering out other available and/or reserved PRBs, thereby limiting $NPRB_{tot}$ to those available reserved handoff resources for purposes of calculating $NPRB_{free}$. In other words, the radio resource management algorithm may determine whether sufficient spare wireless handoff resources are available to fulfill a wireless resource request. In another embodiment, $NPRB_{tot}$ may be determined including all available wireless resources in the cell, with no limitations and/or filters. It is to be noted that the equations and/or techniques used to calculate (i.e., determine) the quantity of wireless resources required to fulfill a resource request and the total amount of available wireless resources in a cell are discussed herein with reference to an example embodiment in a long term evolution (LTE) wireless network, and the scope of the instant disclosure should not be limited thereto. Variations of these equations and/or techniques, applicable to other interface technologies, are contemplated and intended to be included within the scope of the instant disclosure.

If the comparison of step 114 reveals that the total amount of wireless handoff and/or other resources available in the cell meets or exceeds the estimated quantity of wireless resources required to fulfill the resource request, the resource request may be accepted and arranged in a priority queue at step 116. A wireless resource request may be arranged within the queue in accordance with its assigned resource priority value. For example, a national security/emergency preparedness, law enforcement (NSEP-LE) responder may be assigned the highest resource priority value among resource requests received at a network device employing the radio resource management algorithm. The NSEP-LE resource request may be arranged in the priority queue at the highest, or first/next served position, ahead of all remaining resource requests in the priority queue.

The radio resource management algorithm may create and administer a new priority queue for prioritizing access to wireless resources. In an embodiment, a new priority queue created by the radio resource management algorithm may be operated on the hardware and/or software of a wireless network device the cell is provisioned on, such as a base transceiver station, independently from an existing connection admission control (CAC) algorithm already in place on the network device. In such an embodiment, the radio resource management algorithm may monitor its priority queue and provide resource admission decisions to the existing CAC algorithm. In another embodiment, the priority queue created by the radio resource management algorithm may supplement or replace an existing resource admission queue operated by an existing CAC algorithm, in essence acting as a "shadow queue." In yet another embodiment, the resource priority values evaluated and/or optimized by the radio resource management algorithm may supersede priority values assigned by an existing CAC algorithm to resource requests placed in an existing resource admission queue operated by the existing CAC algorithm. The priority queue created by the radio resource management algorithm may be used to control access to wireless resources, for example wireless handoff resources, by determining the order resource requests are fulfilled in through their arrangement within the priority queue.

The time for which a resource request may remain in the priority queue may be limited in accordance with a maximum queuing time. The maximum queuing time may be determined by the radio resource management algorithm, by another device within the cellular network (e.g., a network device configured with a network resource admission control (NRAC)), or a combination thereof. If a resource request remains in the priority queue after the maximum allowed queuing time has been reached, the resource request may be rejected and/or deleted from the priority queue.

If the comparison of step 114 reveals that the total amount of wireless handoff and/or other resources available in the cell does not meet the estimated quantity of wireless resources required to fulfill the resource request, the radio resource management algorithm may cause one or more congestion control mechanisms to be executed at step 118. Congestion control mechanisms may be used to accelerate the release (i.e., "freeing up") of wireless resources, for example wireless handoff resources, that are currently consumed by other devices, processes, etc. The radio resources management algorithm makes available a number of congestion control mechanisms, including adjusting a handoff resources reservation percentage, downgrading a service level of at least one existing resource consumer, applying a handoff delay to one or more additional resource requests in accordance with respective resource priority values, rejecting one or more additional resource requests in accordance with respective resource priority values, and releasing a soft handoff link resource. The radio resource management algorithm may execute a single congestion control mechanism, or may execute several congestion control mechanisms simultaneously. During simultaneous execution, combinations of single or multiple congestion control mechanisms may be executed in a variety of ways, for example on a per quality of service level basis, a type of resource request basis, and the like. It is to be noted that the congestion control mechanisms listed herein are merely examples, and the scope of the instant disclosure should not be limited thereto.

An example congestion control mechanism is adjusting a handoff resources reservation percentage. The wireless resource management algorithm may be configured to reserve a percentage of a cell's wireless resources for fulfilling handoff resource requests. When an abnormally high volume of handoff resource requests are received by a particular cell, the available reserved handoff resources may be rapidly exhausted, resulting in congestion in the cell. In response to the congestion condition, the radio resources management algorithm may increase the percentage of wireless resources reserved for handoff requests. Alternately, the radio resource management algorithm may direct an increase of a percentage of wireless resources reserved for handoff requests by an existing connection admission control (CAC) algorithm acting in concert with the radio resource management algorithm. As wireless resources are released back to the cell, they may be reserved in accordance with the increased percentage of wireless resources reserved for handoff requests. In turn, a larger volume of handoff resource requests may be fulfilled from the increased quantity of available handoff resources. However, it is possible that fewer new resource requests may be fulfilled as a result of a corresponding decrease in the quantity of wireless resources available to fulfill resource requests other than handoff resource requests.

Another example of a congestion control mechanism is downgrading a service level of at least one existing resource consumer. Service levels may be downgraded for existing connections to wireless cell resources, may be downgraded for individual new or handoff resource requests, or a combination thereof. A service level downgrade may be affected in a number of ways. A service level downgrade may be made in accordance with a quality of service (QoS) level, a modulation and coding scheme (MCS) level, a resource priority level assigned to the connection or request by the radio resource management algorithm, and the like. For example, a connection guaranteed a platinum level QoS may be downgraded to a gold level QoS, while a gold level QoS may be downgraded to a silver level QoS, and so on. A service level downgrade may involve, for example decreasing the amount of wireless radio bandwidth allocated to a connection. If the connection is provisioned in accordance with a guaranteed bit rate (GBR) tier, the downgrade may involve reprovisioning the connection at the next lowest tier. The radio resource management algorithm may determine which connections and/or requests are associated with services that are the least sensitive to increased delay, for example non-real time web browsing, and downgrade those connections before downgrading more sensitive connections. A service level downgrade may be temporary, for example until the congestion condition is relieved, or may be permanent for as long as the affected device is connected to the cell.

Another example of a congestion control mechanism is applying a handoff delay to one or more additional resource requests in accordance with respective resource priority values. The radio resource management algorithm may affect handoff delay by altering a handoff margin applied to handoff resource requests. A handoff margin is measured as the difference in signal strengths received at a requesting device from the source cell the requesting device is currently connected to and the target cell the handoff request is directed to. Typically, a minimum handoff margin must be met before a handoff resource request will be fulfilled by a target cell. If the target margin for a particular target cell is increased, it may take longer for the signal strengths between the source and target cells received at devices with existing connections in neighboring cells to reach the handoff margin, thus imposing a handoff delay before those devices make handoff resource requests to the target cell. By reducing the number of handoff resource requests received at a target cell, larger quantities of handoff resources may be available. Varying handoff margins may be assigned by the radio resource management algorithm in accordance with the resource priorities assigned by the algorithm, for example lower priority requests may be subjected to longer delays.

Another example of a congestion control mechanism is releasing a soft handoff connection resource. It is known that certain wireless interface technologies, for example UMTS, employ soft handoff techniques when a connection is handed off between neighboring cells. In a soft handoff scenario, a device may maintain its connection to its source cell, while it establishes one or more soft handoff connections to corresponding target cells prior to being handed off to one of those target cells. These soft handoff connections may be established and/or maintained even when a handoff is not imminent. The radio resource management protocol may release one or more soft handoff connections to its cell in order to make those handoff resources available for prioritized resource requests. Devices with the highest number of soft handoff connections may have their soft handoff connections released first. Alternatively, the radio resource management algorithm may release soft handoff connections from lower priority connections before soft handoff connections of higher priority connections are released.

Figure 2:
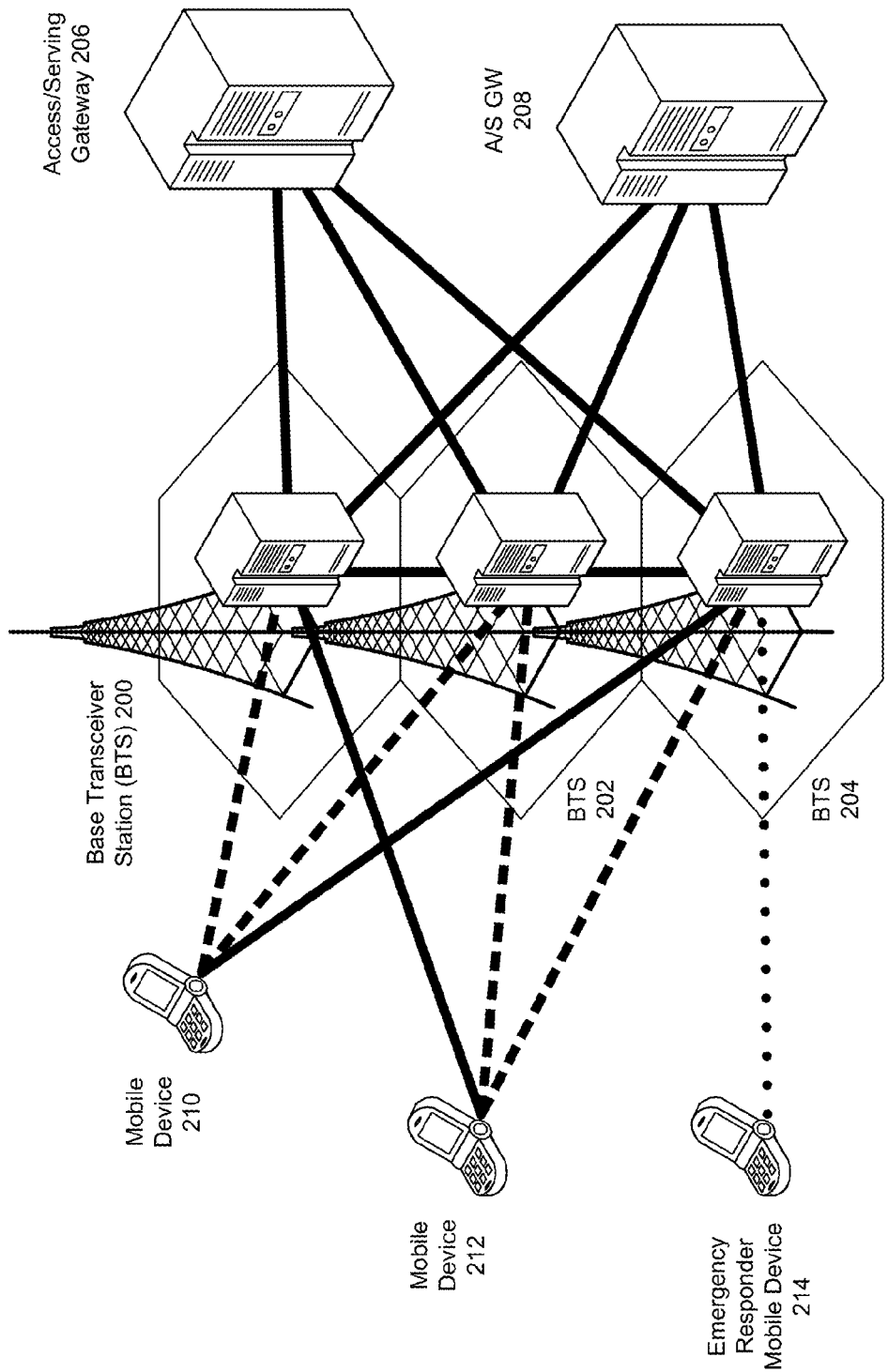
FIG. 2 is depicts an example of devices with soft handoff connections that may be released in order to make handoff resources available for prioritized access in accordance with a radio resource management algorithm.

FIG. 2 depicts an example of devices with simultaneous soft handoff connections to one or more cells. The base transceiver stations (BTSs) 200, 202, and 204, are connected to the access/serving gateways (A/S GWs) 206 and 208. The radio resource management algorithm is operating on each of the BTSs 200, 202, and 204. The mobile device 210 has an existing wireless resource connection with a source cell provisioned on the BTS 204, depicted in the figure as a solid line. The mobile device 210 is also maintaining two handoff resource connections with the BTSs 200 and 202, depicted in the figure as dashed lines. It should be noted that the mobile device 210 is depicted with two handoff connections for the sake of simplicity. A real world communications device may simultaneously maintain hundreds of handoff resource connections. Similarly, the mobile device 212 has an existing wireless resource connection with a source cell provisioned on the BTS 200, and is also maintaining two handoff resource connections with the BTSs 202 and 204.

If the cell provisioned on BTS 204 becomes congested, there may not be sufficient wireless resources available to fulfill additional wireless resource requests. For example, the emergency responder mobile device 214 is making a new resource request, depicted in the figure as a dotted line, to the cell provisioned on BTS 204. The radio resource management algorithm may assign a high resource priority value to the new resource request from the emergency responder mobile device 214. The radio resource management algorithm may determine that the mobile device 212 has a lower resource priority value assigned to its soft handoff connection to the cell provisioned on BTS 204. The radio resource management algorithm may release the soft handoff connection to the mobile device 212, thereby making those handoff resources available for fulfilling the new resource request of the emergency responder mobile device 214. It is to be noted that the techniques used to release soft handoff resources with respect to FIG. 2 are discussed with reference to an example embodiment in a universal mobile telecommunications system (UMTS) wireless network, and the scope of the instant disclosure should not be limited thereto. Other techniques for releasing soft handoff resources, applicable to other interface technologies, are contemplated and intended to be included within the scope of the instant disclosure.

Returning to FIG. 1, if the comparison of step 114 reveals that the total amount of wireless handoff and/or other resources available in the cell does not meet the estimated quantity of wireless resources required to fulfill the resource request, and one or more congestion control mechanisms have been executed by the radio resource management algorithm at step 118, the radio resource management algorithm may decide, at step 120, whether to accept the resource request and to arrange it in a priority queue at step 116, or to reject the request at step 122. The decision at step 120 may be made based upon the resource priority assigned to the resource request. For example, the radio resource management algorithm may determine a minimum resource priority level (i.e., a priority threshold). The priority threshold may be determined in accordance with current conditions in a cell, for example a congestion condition. Resource requests that are assigned resource priority values below the priority threshold may be rejected at step 122 if there are not sufficient wireless resources available to fulfill the request. However, resource requests that are assigned resource priority values that meet or exceed the priority threshold may be accepted and arranged in a priority queue at step 116, even if there are not sufficient wireless resources available to fulfill the request.

Figure 3:
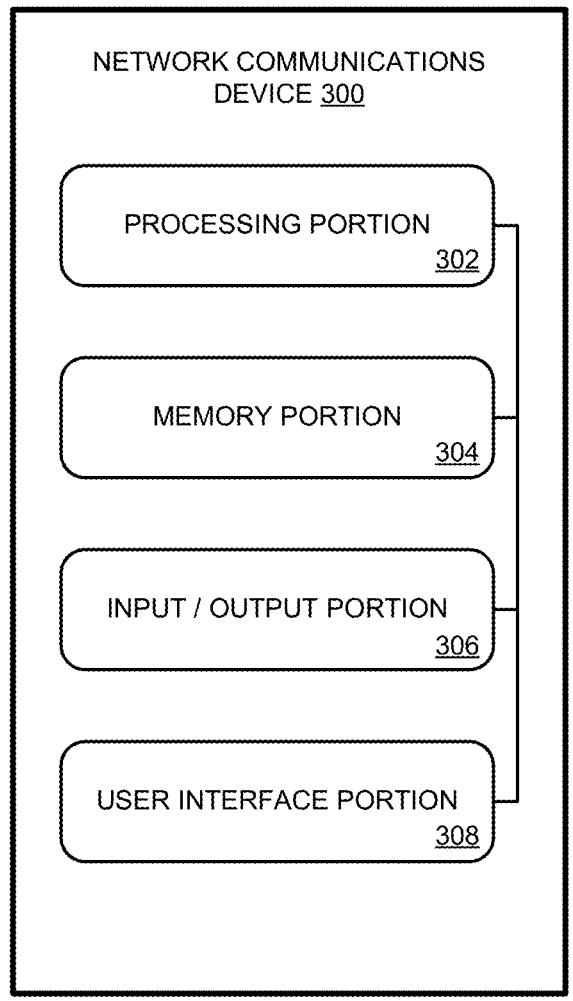
FIG. 3 is a block diagram of an example network communications device configured to prioritize requests to network resources in accordance with a radio resource management algorithm.

FIG. 3 is a block diagram of an example network communications device 300 configured to prioritize requests to network resources in accordance with a radio resource management algorithm. The network communications device can comprise any appropriate device configured to provide services in a wireless and/or wireline communications network, examples of which include a base transceiver station (BTS), a base station controller (BSC), a mobile switching center (MSC), a service control point (SCP), an access/service gateway (A/S GW), a service GPRS support node (SGSN), a gateway GPRS support node (GGSN), a home location register (HLR), a visitor location register (VLR), an authentication center (AuC), a cell broadcast center (CBC), a domain name server (DNS), a firewall, and the like. Network communications device 300 can be part of and/or in communications with various wireless and/or wireline communications networks and/or network components, some of which are described in more detail below.

In an example configuration, the network communications device 300 comprises a processing portion 302, a memory portion 304, an input/output portion 306, and an optional user interface (UI) portion 308. It is emphasized that the block diagram depiction of network communications device 300 is exemplary and not intended to imply a specific implementation and/or configuration. The processing portion 302, memory portion 304, and input/output portion 306 are coupled together to allow communications therebetween. In various embodiments, the input/output portion 306 comprises one or more radio receivers, receivers, and/or transceivers of the network communications device 300, one or more wireline interfaces of the network communications device, or a combination thereof. The input/output portion 306 is capable of receiving and/or providing wireless communications between the network communications device and requesting devices, and of provisioning wireless radio resources to requesting devices in accordance with a radio resource management algorithm as described above. For example, the input/output portion 306 is capable of receiving a resource request from a requesting device, and of provisioning the requesting device with a quantity of wireless resources if the resource request is accepted and fulfilled, as described herein. The network communications device is also capable of sending and/or receiving communications from other network communications devices via the one or more wireline interfaces of the input/output portion 306. In an example embodiment, the input/output portion 306 is capable of receiving a communication from a network resource admission control (NRAC) containing a resource prioritization scheme for implementation by the radio resource management algorithm operating on the network communications device. In various configurations, the input/output portion 306 can receive and/or provide information via any appropriate means, such as, for example, optical means (e.g., infrared), electromagnetic means (e.g., RF, Wi-Fi (IEEE 802.11), WiMAX (IEEE 802.16), Bluetooth®, and the like), packet formatted data transmission protocols (e.g., TCP/IP, SONET, ATM, ISDN, Frame Relay, and the like), or a combination thereof.

The processing portion 302 may include any hardware and/or software necessary for operating and/or controlling the memory portion 304, the input/output portion 306, and/or the user interface (UI) portion 308. For example, the processing portion 302 may be individual digital logic components, one or more processors, one or more microprocessors, an application-specific integrated circuit (ASIC), and the like. The processing portion 302 may have its own memory such as random access memory (RAM), register memory, cache memory, and the like. The processing portion 302 may operate on computer-executable instructions. Computer-executable instructions may include computer-readable instructions, for example machine code, byte code, script language, runtime code, and the like. The computer-executable instructions for example, when executed by the processing portion 302, may cause the processing portion to perform a method of provisioning wireless radio resources to requesting devices in accordance with a radio resource management algorithm as described above. For example, the processing portion 302 is capable of prioritizing a resource request received by the network communications device by executing algorithm processes, such as evaluating functions to determine resource priority values, optimizing resource priority values, and arranging resource requests in a priority queue, as described above.

In a basic configuration, the network communications device 300 can include at least one memory portion 404. The memory portion can store any information utilized in conjunction with provisioning wireless radio resources to requesting devices in accordance with a radio resource management algorithm as described above. For example, the memory portion 304 is capable of storing information pertaining to factors used in evaluating functions to determine resource priority values, optimized resource priority values, resource priority values assigned to one or more resource requests and/or existing connections, and the like, as described above. Depending upon the exact configuration and type of the processor portion 302, the memory portion 304 can be volatile (such as some types of RAM), non-volatile (such as ROM, flash memory, etc.), or a combination thereof. The network communications device 300 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device.

The network communications device 300 also can contain a user interface (UI) portion 308 for allowing a user (e.g., an administrator) to communicate with the network communications device. The UI portion is capable of rendering any information utilized in conjunction with provisioning wireless radio resources to requesting devices in accordance with a radio resource management algorithm as described above. For example, the UI portion may render graphical representations of available wireless handoff resources within a cell, a priority queue, and the like. The UI portion 308 can provide the ability to control and/or configure the network communications device, either locally or remotely via, for example, buttons, soft keys, voice actuated controls, a touch screen, visual cues (e.g., moving a hand in front of a camera integrated in the communications device (not shown)), or the like. The UI portion can provide visual information (e.g., via a display), audio information (e.g., via speaker), or a combination thereof. In various configurations, the UI portion 308 can comprise one or more displays, one or more touch screens, a keyboard, a speaker, a microphone, a camera, a motion detector, or any combination thereof. The UI portion 308 can comprise means for inputting biometric information, such as, for example, fingerprint information, retinal information, voice information, and/or facial characteristic information.

Figure 4:
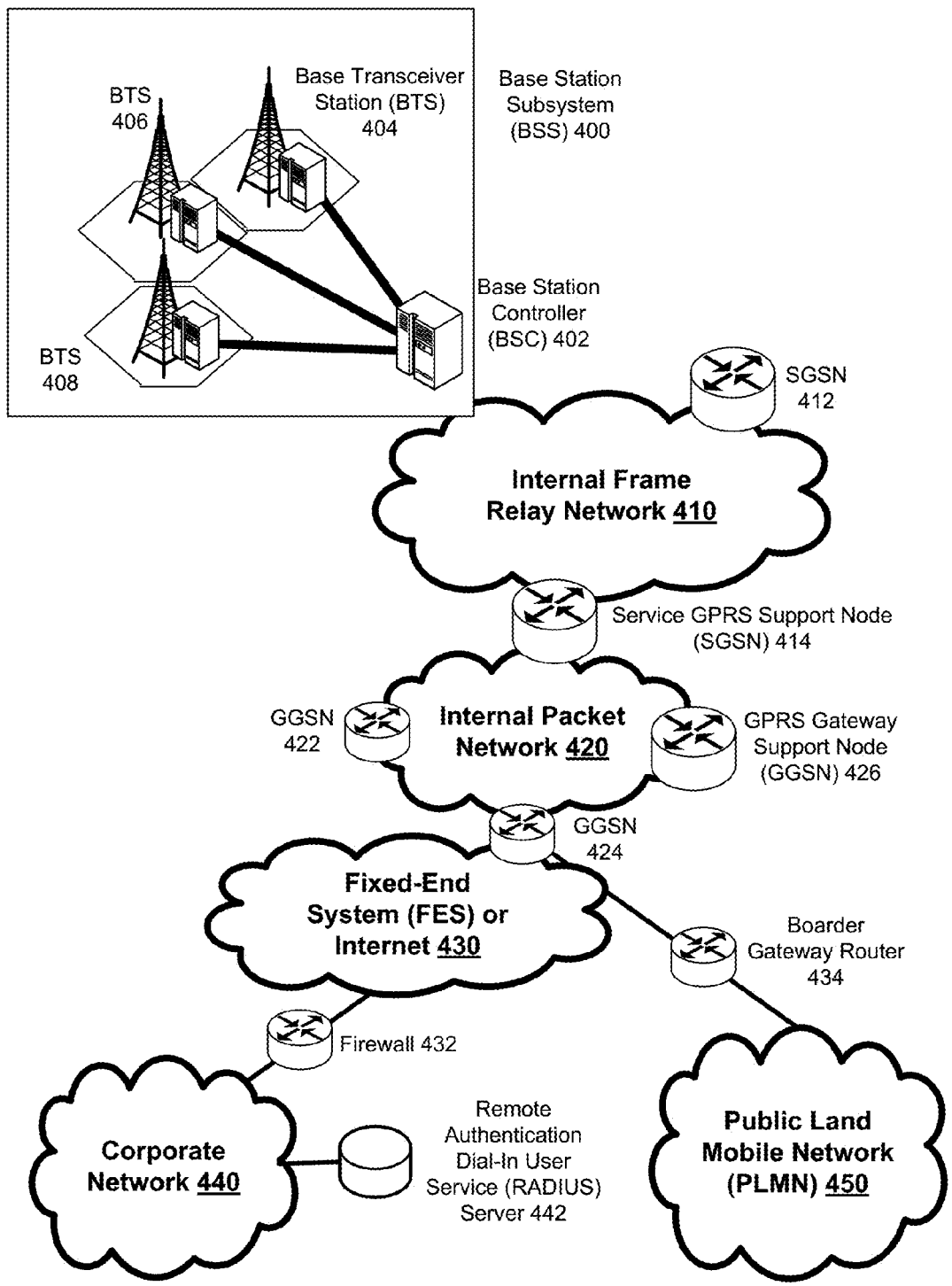
FIG. 4 depicts an example packet-based mobile cellular network environment, such as a GPRS network, in which provisioning wireless radio resources to requesting devices in accordance with a radio resource management algorithm can be implemented.

FIG. 4 depicts an example packet-based mobile cellular network environment, such as a GPRS network, in which provisioning wireless radio resources to requesting devices in accordance with a radio resource management algorithm can be implemented. In the example packet-based mobile cellular network environment shown in FIG. 4, there are a plurality of Base Station Subsystems ("BSS") 400 (only one is shown), each of which comprises a Base Station Controller ("BSC") 402 serving a plurality of Base Transceiver Stations ("BTS") such as BTSs 404, 406, and 408. BTSs 404, 406, 408, etc. are the access points where users of packet-based mobile devices become connected to the wireless network. In exemplary fashion, the packet traffic originating from user devices is transported via an over-the-air interface to a BTS 408, and from the BTS 408 to the BSC 402. Base station subsystems, such as BSS 400, are a part of internal frame relay network 410 that can include Service GPRS Support Nodes ("SGSN") such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol ("IP") networks such as Public Land Mobile Network ("PLMN") 450, corporate intranets 440, or Fixed-End System ("FES") or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service ("RADIUS") server 442 may be used for caller authentication when a user of a mobile cellular device calls corporate network 440.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 5:
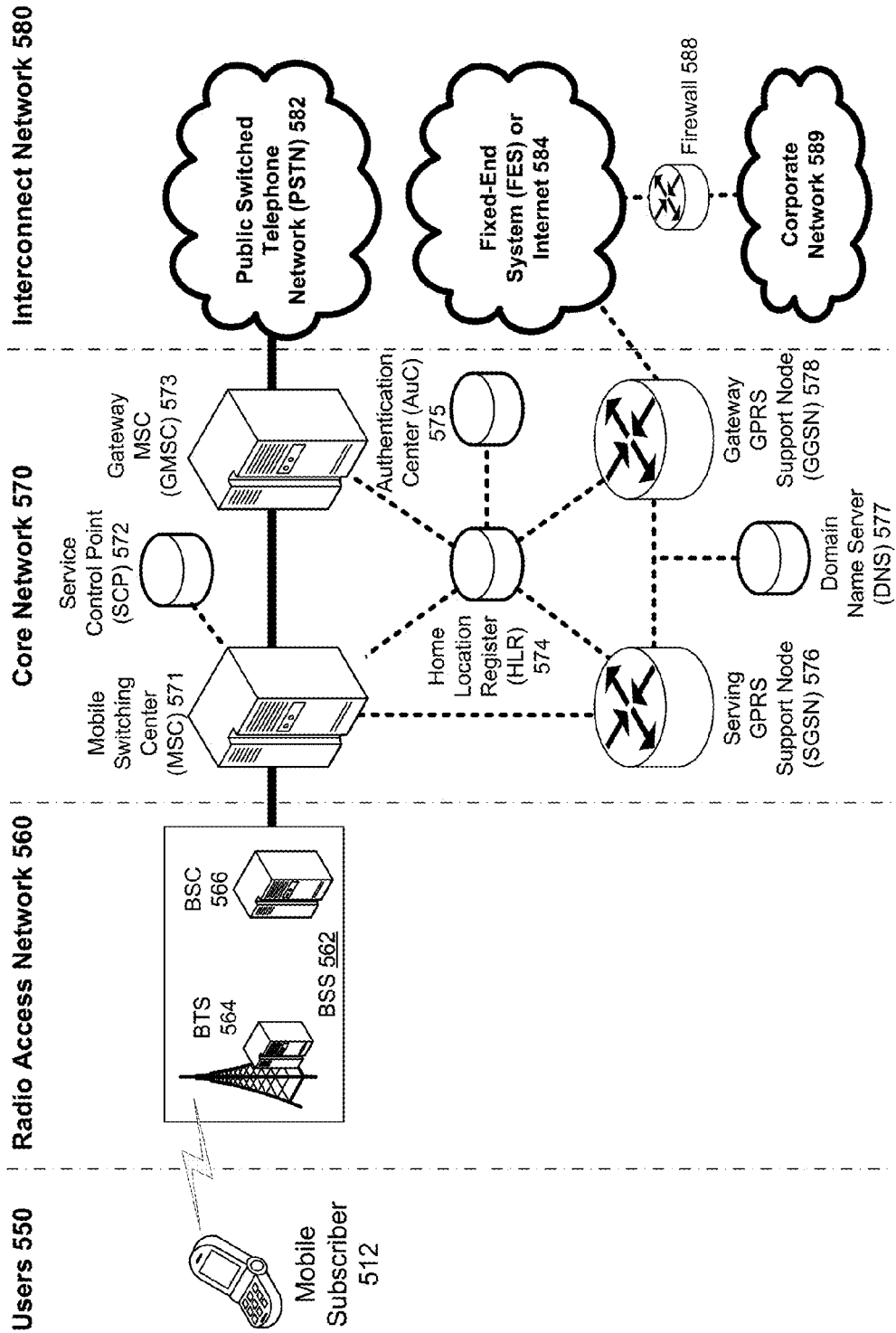
FIG. 5 depicts an example architecture of a typical GPRS network in which provisioning wireless radio resources to requesting devices in accordance with a radio resource management algorithm can be implemented.

FIG. 5 illustrates an architecture of a typical GPRS network in which provisioning wireless radio resources to requesting devices in accordance with a radio resource management algorithm can be implemented. The architecture depicted in FIG. 5 is segmented into four groups: users 550, a radio access network 560, a core network 570, and an interconnect network 580. Users 550 comprise a plurality of end users. Note: device 512 is referred to as a mobile subscriber[[s]] in the description of the network shown in FIG. 5. In an example embodiment, the device depicted as a mobile subscriber 512 comprises a communications device (e.g., communications device 300). A radio access network 560 comprises a plurality of base station subsystems such as BSSs 562, which include BTSs 564 and BSCs 566. A core network 570 comprises a host of various network elements. As illustrated in FIG. 5, core network 570 may comprise a Mobile Switching Center ("MSC") 571, Service Control Point ("SCP") 572, gateway MSC 573, SGSN 576, Home Location Register ("HLR") 574, Authentication Center ("AuC") 575, Domain Name Server ("DNS") 577, and GGSN 578. An example interconnect network 580 also comprises a host of various networks and other network elements. As illustrated in FIG. 5, interconnect network 580 comprises a Public Switched Telephone Network ("PSTN") 582, Fixed-End System ("FES") or Internet 584, firewall 588, and Corporate Network 589.

A mobile switching center can be connected to a large number of base station controllers. At an MSC 571, for instance, depending on the type of traffic, the traffic may be separated in that voice may be sent to a Public Switched Telephone Network ("PSTN") 582 through a Gateway MSC ("GMSC") 573, and/or data may be sent to an SGSN 576, which then sends the data traffic to a GGSN 578 for further forwarding.

When an MSC 571 receives call traffic, for example from a BSC 566, it sends a query to a database hosted by an SCP 572. The SCP 572 processes the request and issues a response to the MSC 571 so that it may continue call processing as appropriate.

The HLR 574 is a centralized database for users to register to the GPRS network. The HLR 574 stores static information about the subscribers such as the International Mobile Subscriber Identity ("IMSI"), subscribed services, and a key for authenticating the subscriber. The HLR 574 also stores dynamic subscriber information such as the current location of the mobile subscriber. Associated with the HLR 574 is the AuC 575. The AuC 575 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 5, when a mobile subscriber 512 initiates the attach process by turning on the network capabilities of the mobile device, an attach request is sent by the mobile subscriber 512 to an SGSN 576. The SGSN 576 queries another SGSN, to which the mobile subscriber 512 was attached before, for the identity of the mobile subscriber 512. Upon receiving the identity of the mobile subscriber 512 from the other SGSN, the SGSN 576 requests more information from the mobile subscriber 512. This information is used to authenticate the mobile subscriber 512 to the SGSN 576 by the HLR 574. Once verified, the SGSN 576 sends a location update to the HLR 574 indicating the change of location to the new SGSN, in this case SGSN 576. The HLR 574 notifies the old SGSN, to which mobile subscriber 512 was attached before, to cancel the location process for the mobile subscriber 512. The HLR 574 then notifies the SGSN 576 that the location update has been performed. At this time, the SGSN 576 sends an Attach Accept message to the mobile subscriber 512, which in turn sends an Attach Complete message to the SGSN 576.

After attaching itself with the network, the mobile subscriber 512 then goes through the authentication process. In the authentication process, the SGSN 576 sends the authentication information to the HLR 574, which sends information back to the SGSN 576 based on the user profile that was part of the user's initial setup. The SGSN 576 then sends a request for authentication and ciphering to the mobile subscriber 512. The mobile subscriber 512 uses an algorithm to send the user identification (ID) and password to the SGSN 576. The SGSN 576 uses the same algorithm and compares the result. If a match occurs, the SGSN 576 authenticates the mobile subscriber 512.

Next, the mobile subscriber 512 establishes a user session with the destination network, a corporate network 589, by going through a Packet Data Protocol ("PDP") activation process. Briefly, in the process, the mobile subscriber 512 requests access to the Access Point Name ("APN"), for example, UPS.com, and the SGSN 576 receives the activation request from the mobile subscriber 512. The SGSN 576 then initiates a Domain Name Service ("DNS") query to learn which GGSN node has access to the UPS.com APN. The DNS query is sent to a DNS server within the core network 570, such as DNS 577, which is provisioned to map to one or more GGSN nodes in the core network 570. Based on the APN, the mapped GGSN 578 can access the requested corporate network 589. The SGSN 576 then sends to the GGSN 578 a Create Packet Data Protocol ("PDP") Context Request message that contains necessary information. The GGSN 578 sends a Create PDP Context Response message to the SGSN 576, which then sends an Activate PDP Context Accept message to the mobile subscriber 512.

Once activated, data packets of the call made by the mobile subscriber 512 can then go through the radio access network 560, the core network 570, and the interconnect network 580, in a particular fixed-end system or Internet 584 and firewall 588, to reach the corporate network 589.

Figure 6:
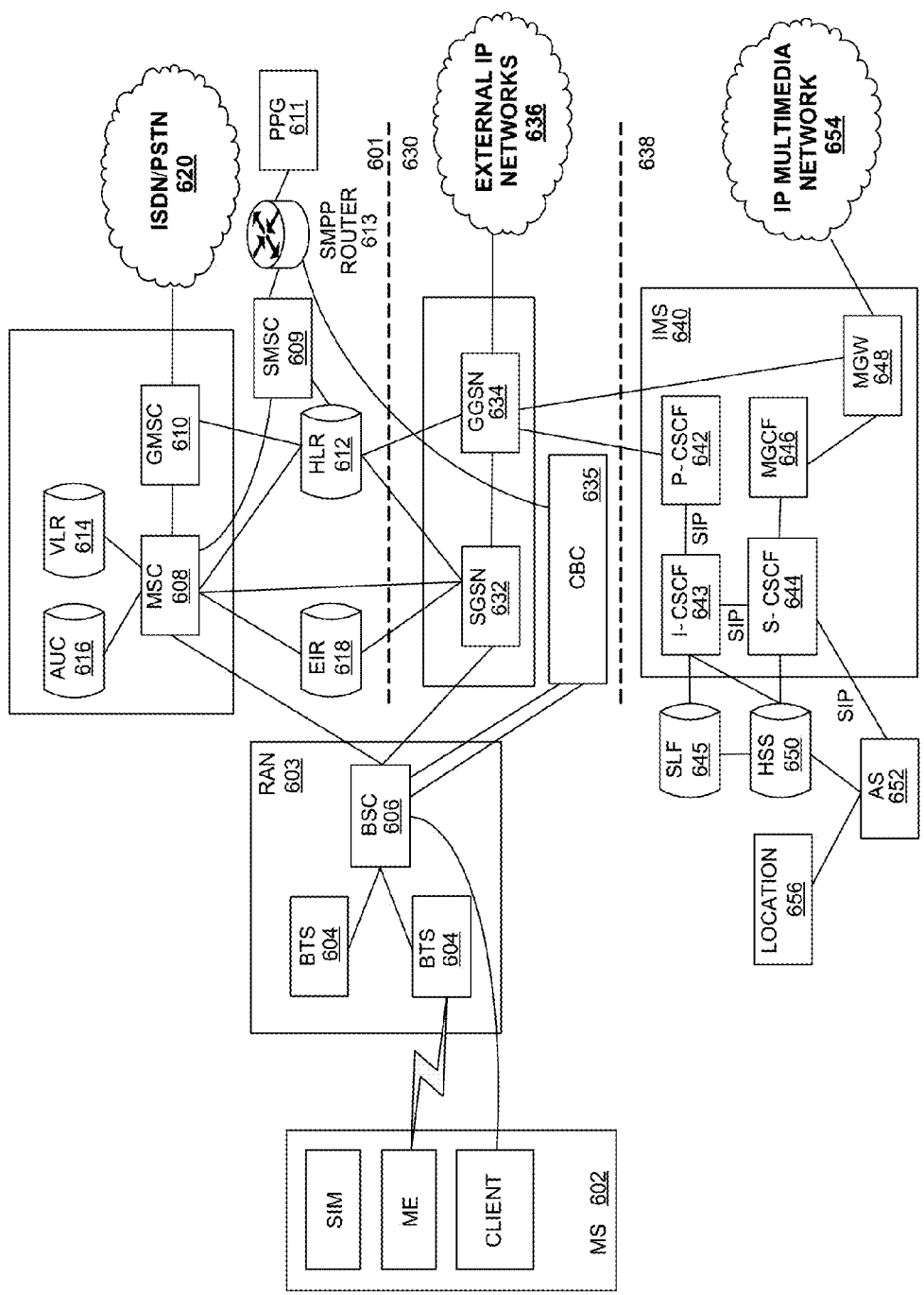
FIG. 6 depicts an example GSM/GPRS/IP multimedia network architecture within which provisioning wireless radio resources to requesting devices in accordance with a radio resource management algorithm can be implemented.

FIG. 6 illustrates an example GSM/GPRS/IP multimedia network architecture within which provisioning wireless radio resources to requesting devices in accordance with a radio resource management algorithm can be implemented. As illustrated, the architecture of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer that is used by mobile subscribers, with a Subscriber Identity Module (SIM) or a Universal Integrated Circuit Card (UICC). The SIM or UICC includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station subsystem (BSS) or radio access network (RAN) 603.

The GSM core network 601 also includes a Mobile Switching Center (MSC) 608, a Gateway Mobile Switching Center (GMSC) 610, a Home Location Register (HLR) 612, a Visitor Location Register (VLR) 614, an Authentication Center (AuC) 616, and an Equipment Identity Register (EIR) 618. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 635 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) [[644]]. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSSs 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656

(e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

The various functions and/or features of the radio resource management algorithm described herein can be implemented in connection with hardware or software or, where appropriate, with a combination of both. Thus, the methods and apparatuses for prioritizing requests to network resources in accordance with a radio resource management algorithm can be implemented, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for prioritizing requests to network resources. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for prioritizing requests to network resources in accordance with a radio resource management algorithm can also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for prioritizing requests to network resources. When implemented on a general-purpose processor, the program code combines with the processor to provide a unique apparatus that operates to invoke the functionality of prioritizing requests to network resources in accordance with a radio resource management algorithm. Additionally, any storage techniques used in connection with prioritizing requests to network resources in accordance with a radio resource management algorithm can invariably be a combination of hardware and software.

While prioritizing requests to network resources in accordance with a radio resource management algorithm have been described in connection with the various embodiments of the various figures, it is to be understood that other similar embodiments can be used or modifications and additions can be made to the described embodiments for prioritizing requests to network resources in accordance with a radio resource management algorithm without deviating therefrom. For example, one skilled in the art will recognize that prioritizing requests to network resources in accordance with a resource management algorithm as described in the present application may apply to any environment, whether wired or wireless, and may be applied to any number of such devices connected via a communications network and interacting across the network. Therefore, prioritizing requests to network resources in accordance with a radio resource management algorithm should not be limited to any single embodiment, but rather should be construed in breadth and scope in accordance with the appended claims.

What is claimed is:

1. A method comprising: receiving a request for network resources within a cell:
    evaluating one or more of a plurality of functions associated with the request for network resources based on a first set of predetermined factors:
    determining a first resource priority value for the request for network resources based on a result of evaluating the one or more of a plurality of functions:
    optimizing the first resource priority value in accordance with one or more constraints to provide an optimized first resource priority value:
    assigning the optimized first resource priority value to the request for network resources:
    generating an estimate of a quantity of network resources required to fulfill the request for network resources based on a second set of predetermined factors:
    determining an amount of available network resources;
    comparing the estimate to the amount of available network resources
    if the amount of available network resources is equal to or greater than the estimate,
    then: accepting the request for network services;
    assigning the request for network services to a position in a priority queue based on the first resource priority value;
    monitoring the priority queue;
    controlling access to the network resources through the priority queue;
    limiting the time for which a request for network resources may remain in the priority queue in accordance with a maximum queuing time;
    if the estimate is greater than the amount of available network resources:
    executing a congestion control mechanism; and
    deciding whether to accept the request to network resources based on the congestion control mechanism.

2. The method of claim 1, wherein the first set of predetermined factors comprises one or more of a handoff priority function, a new call priority function, and a global priority function.

3. The method of claim 1, wherein the prioritizing is initiated responsive to a request from a network resource admission control.

4. The method of claim 1, further comprising:
    determining whether a quantity of available handoff resources meets the requirement estimate;

when the quantity of available handoff resources meets the estimate, arranging the resource request into the priority queue in accordance with the resource priority value; and when the resource requirement exceeds the quantity of available handoff resources:
  executing a congestion control mechanism;
  determining whether the resource priority value meets a priority threshold;
  when the resource priority value meets the priority threshold, arranging the request into the priority queue in accordance with a second resource priority value; and
  when the second resource priority value does not meet the priority threshold, rejecting the request.

5. The method of claim 4, wherein the congestion control mechanism comprises at least one of:
  adjusting a handoff resources reservation percentage;
  downgrading a service level of at least one existing resource consumer;
  applying a handoff delay to one or more additional resource requests in accordance with respective resource priority values;
  rejecting one or more additional resource requests in accordance with respective resource priority values; and
  releasing a soft handoff link resource.

6. The method of claim 4, wherein the prioritizing and the congestion control mechanism are coordinated by a network resource admission control.

7. A device comprising: a processor; and
  memory coupled to the processor, the memory comprising executable instructions that when executed by the processor cause the processor to effectuate operations comprising:
  receiving a request for network resources within a cell;
  evaluating one or more of a plurality of functions associated with the request for network resources based on a first set of predetermined factors;
  determining a first resource priority value for the request for network resources based on a result of evaluating the one or more of a plurality of functions;
  optimizing the first resource priority value in accordance with one or more constraints to provide an optimized first resource priority value;
  assigning the optimized first resource priority value to the request for network resources;
  generating an estimate of a quantity of network resources required to fulfill the request for network resources based on a second set of predetermined factors;
  determining an amount of available the network resources;
  comparing the estimate to the amount of available network resources
  if the amount of available network resources is equal to or greater than the estimate, then;
  accepting the request for network services;
  assigning the request for network services to a position in a priority queue based on the first resource priority value;
  monitoring the priority queue;
  controlling access to the network resources through the priority queue;
  limiting the time for which a request for network resources may remain in the priority queue in accordance with a maximum queuing time;
  if the estimate is greater than the amount of available network resource, then:
  executing a congestion control mechanism; and
  deciding whether to accept the request to network resources based on the congestion control mechanism.

8. The device of claim 7, wherein the first set of predetermined factors comprises one or more of a handoff priority function, a new call priority function, and a global priority function.

9. The device of claim 7, wherein the prioritizing component is initiated responsive to a request from a network resource admission control.

10. The device of claim 7, further comprising a resource management component configured to:
  determine whether a quantity of available handoff resources meets the estimate;
  when the quantity of available handoff resources meets the estimate, arrange the resource request into the priority queue in accordance with the resource priority value; and
  when the resource requirement exceeds the quantity of available handoff resources:
  execute a congestion control mechanism;
  derive a priority threshold;
  determine whether the resource priority value meets a priority threshold;
  when the resource priority value meets the priority threshold, arrange the request into the priority queue in accordance with a second resource priority value; and
  when the second resource priority value does not meet the priority threshold, reject the request.

11. The device of claim 10, wherein the congestion control mechanism is configured to:
  adjust a handoff resources reservation percentage;
  downgrade a service level of at least one existing resource consumer;
  apply a handoff delay to one or more additional resource requests in accordance with respective resource priority values;
  reject one or more additional resource requests in accordance with respective resource priority values; and
  release a soft handoff link resource.

12. The device of claim 10, wherein the prioritizing component and the congestion control mechanism are coordinated by a network resource admission control.

13. A non-transitory computer-readable storage medium, the non-transitory computer-readable storage medium comprising executable
  instructions that when executed by a processor cause the processor to effectuate operations comprising:
  receiving a request for r network resources within a cell:
  evaluating one or more of a plurality of functions associated with the request for network resources based on a first set of predetermined factors:
  determining a first resource priority value for the request for network resources based on a result of evaluating the one or more of a plurality of functions:
  optimizing the first resource priority value in accordance with one or more constraints to provide an optimized first resource priority value:
  assigning the optimized first resource priority value to the request for network resources:
  generating an estimate of a quantity of network resources required to fulfill the request for network resources based on a second set of predetermined factors:
  determining an amount of available network resources;
  comparing the estimate to the amount of available network resources if the amount of available network resources is equal to or greater than the estimate accepting the request for network services;

assigning the request for network services to a position in a priority queue based on the first resource priority value;

monitoring the priority queue;

controlling access to the network resources through the priority queue;

limiting the time for which a request for network resources may remain in the priority queue in accordance with a maximum queuing time;

if the estimate is greater than the amount of available network resources;

executing a congestion control mechanism; and deciding whether to accept the request to network resources based on the congestion control mechanism.

14. The non-transitory computer-readable storage medium of claim 13, wherein the first set of predetermined factors comprises one or more of a handoff priority function, a new call priority function, and a global priority function.

15. The non-transitory computer-readable storage medium of claim 13, wherein the prioritizing is initiated responsive to a request from a network resource admission control.

16. The non-transitory computer-readable storage medium of claim 13, the method further comprising:

determining whether a quantity of available handoff resources meets the estimate;

when the quantity of available handoff resources meets the resource requirement, arranging the resource request into the priority queue in accordance with the resource priority value; and when the resource requirement exceeds the quantity of available handoff resources: executing a congestion control mechanism;

determining whether the resource priority value meets a priority threshold;

when the resource priority value meets the priority threshold, arranging the request into the priority queue in accordance with a second resource priority value; and when the second resource priority value does not meet the priority threshold, rejecting the request.

17. The non-transitory computer-readable storage medium of claim 16, wherein the congestion control mechanism comprises at least one of:

adjusting a handoff resources reservation percentage;

downgrading a service level of at least one existing resource consumer;

applying a handoff delay to one or more additional resource requests in accordance with respective resource priority values;

rejecting one or more additional resource requests in accordance with respective resource priority values; and releasing a soft handoff link resource.

18. The non-transitory computer-readable storage medium of claim 16, wherein the prioritizing and the congestion control mechanism are coordinated by a network resource admission control.

* * * * *